United States Patent [19]

Callahan et al.

[11] Patent Number: 4,914,592
[45] Date of Patent: Apr. 3, 1990

[54] APPARATUS FOR CONTROLLING A STEERING-BY-DRIVING SYSTEM

[75] Inventors: William L. Callahan, Lafayette; Bruce C. Noah, W. Lafayette, both of Ind.; Jonathan B. Kulp, Terre Hill, Pa.

[73] Assignee: TRW Inc., Lyndhurst, Ohio

[21] Appl. No.: 128,067

[22] Filed: Dec. 3, 1987

[51] Int. Cl.$^4$ .......................... G05D 13/00; B00K 7/00
[52] U.S. Cl. ................... 364/424.05; 180/140; 180/6.3; 180/6.48
[58] Field of Search ............. 364/424, 424.01, 424.03, 364/424.05; 180/140, 6.2, 6.24, 6.3, 6.44, 6.48, 248; 74/388 PS

[56] References Cited

U.S. PATENT DOCUMENTS

| | | | |
|---|---|---|---|
| 3,011,579 | 1/1959 | Milliken, Jr. et al. | 180/142 |
| 3,282,050 | 11/1966 | Hanson | 180/6.3 X |
| 3,532,178 | 10/1970 | Lindbom | 180/142 X |
| 3,803,841 | 4/1974 | Erickson et al. | 180/6.48 X |
| 3,841,423 | 10/1974 | Holtkamp et al. | 180/6.3 |
| 3,888,323 | 6/1975 | Patton et al. | 180/6.3 |
| 3,917,014 | 11/1975 | Ward | 180/6.48 |
| 3,987,626 | 10/1976 | Bianchetta | 180/6.48 X |
| 4,051,416 | 9/1977 | Golobay | 180/6.5 X |
| 4,068,767 | 5/1978 | Byers, Jr. | 180/6.48 X |
| 4,072,009 | 2/1978 | Daschievici et al. | 60/484 |
| 4,235,297 | 11/1980 | Porta | 180/6.48 |
| 4,244,184 | 1/1981 | Baldauf et al. | 180/242 X |
| 4,261,431 | 4/1981 | Hawbaker | 180/6.48 |
| 4,263,979 | 4/1981 | Sturgill | 180/79.1 |
| 4,271,918 | 6/1981 | Molby | 180/6.48 |
| 4,301,881 | 11/1981 | Griffin | 180/6.48 |
| 4,399,886 | 8/1983 | Pollmann | 180/197 |
| 4,456,087 | 6/1984 | Lang et al. | 180/142 |
| 4,557,343 | 12/1985 | Pickering | 180/142 |
| 4,566,553 | 1/1986 | McCutcheon | 180/237 |
| 4,574,905 | 3/1986 | Asano et al. | 180/142 |

FOREIGN PATENT DOCUMENTS

8702632 5/1987 PCT Int'l Appl. .................. 180/142

Primary Examiner—Eugene R. LaRoche
Assistant Examiner—Benny Lee
Attorney, Agent, or Firm—Tarolli, Sundheim & Covell

[57] ABSTRACT

An apparatus is disclosed for controlling at least two driven wheels of a vehicle. The apparatus includes two hydraulic motors, each motor drivably connected to an associated drive wheel. A load sense piston pump provides a source of pressurized fluid for operating the hydraulic motors. Associated with each hydraulic motor is an electrically controllable load sense flow control valve assembly, an electrically controllable directional control valve, and a set of counterbalance valves. A microcomputer controls operation of the electrically controllable load sense flow control valve assemblies and the electrically controllable directional control valves in response to electrical signals indicative of rotary position of a steering wheel, position of an operator controlled speed and direction input device, and the speed of the vehicle engine. Steering ratio can be selected by the operator. Vehicle speed is controlled so as to prevent pump cavitation and engine stalling.

17 Claims, 2 Drawing Sheets

APPARATUS FOR CONTROLLING A STEERING-BY-DRIVING SYSTEM

TECHNICAL FIELD

The present invention is directed to a vehicle steering system and is particularly directed to an apparatus for controlling rotational speed and direction of at least two driven wheels of a vehicle and thereby control vehicle movement and steering.

BACKGROUND ART

Steering-by-driving systems for vehicles are well known in the art. A wheeled vehicle having a steering-by-driving system includes at least two driven wheels located on opposite sides of the vehicle. Each driven wheel has an associated motor, typically hydraulic, operatively connected thereto. Each motor is independently drivable at a selected speed and direction. By controlling the speed and direction of each of the driven wheels, the movement and steering of the vehicle are controlled. When the wheels are driven in the same direction at the same speed, the vehicle moves in a straight path. When the wheels are driven in the same direction but one wheel is driven faster than the other, the vehicle turns in the direction of the slower driven wheel. When the wheels are driven at the same speed but in opposite directions, the vehicle turns about a vertical axis. Vehicles capable of having the wheels driven in opposite directions are said to have a zero turning radius.

Some known steering-by-driving systems for vehicles typically include separate levers for individually controlling each driven wheel. Speed, direction, and steering of such vehicles are controlled by the operator moving the levers forward and rearward. Other known steering-by-driving systems for vehicles include a single lever or "joystick" for speed, direction, and steering control. Still other known steering-by-driving systems for vehicles use toggle switches as the control mechanism. While the previous systems have provided speed and steering control of the vehicle, an operator, familiar with driving a road vehicle having a rotatable steering wheel, could find the prior known control systems to be less than satisfactory.

Also, previously known steering-by-driving systems for vehicles have had one steering ratio. Thus, these vehicles have a fixed relationship between the position of the control levers, for example, and the angular displacement of the vehicle, i.e., the vehicle steering angle. Because of this fixed relationship, known steering-by-driving systems have not been totally adequate for vehicles in which different steering ratios would be desirable, such as lawn mowers.

Furthermore, engines for driving hydraulic pumps in known hydraulic, steering-by-driving systems are subject to stalling. Engine stalling typically occurs when the vehicle driven wheels are subjected to a high load, e.g., the vehicle is traveling up a steep hill. When the driven wheels are loaded, the pump provides more fluid than the hydraulic motors of the driven wheels can utilize. When this occurs, the fluid pressure at the pump outlet increases which, in turn, results in the pump resisting the drive force of the engine thereby stalling the engine.

Also, when a vehicle having a steering-by-driving system goes down hill, the hydraulic motors draw more fluid than the pump can provide. When this occurs, the pump cavitates.

SUMMARY OF THE INVENTION

The present invention is a vehicle steering-by-driving system that overcomes the above-mentioned problems. The present invention provides a steering-by-driving system that includes a rotatable steering wheel which, when rotated, causes the vehicle to turn. The present invention also provides a vehicle, steering-by-driving system that permits selection of one of a plurality of steering ratios. The present invention further provides a hydraulic, steering-by-driving system having an engine driven pump in which the ground speed of the vehicle is governed responsive to the speed of the vehicle engine so as to prevent engine stall and pump cavitation.

The present invention provides a new and improved steering-by-driving system in a vehicle having at least two driven wheels (each wheel having an associated hydraulic motor), a rotatable steering wheel, and an electronic control unit for monitoring the rotary position of the steering wheel and controlling the hydraulic motors in response thereto to effect vehicle steering. The vehicle further includes an operator controlled foot pedal. A pedal position sensor outputs a signal having a value indicative of pedal position. The pedal position sensor is connected to the electronic control unit. The position of the pedal controls vehicle speed and direction of vehicle travel. An engine driven pump provides pressurized fluid for operation of the hydraulic motors. The electronic control unit monitors engine RPM's and governs vehicle speed in response thereto to prevent engine stall and pump cavitation. Fault diagnostics are provided to insure that the value of the output signal from the pedal position sensor is within predetermined limits.

In accordance with the present invention, an apparatus is provided for controlling at least two driven wheels of a vehicle in response to rotation of a steering wheel. The apparatus comprises a source of pressurized fluid, a plurality of hydraulic motors, each driven wheel, having an associated hydraulic motor for, when pressurized, rotating its associated driven wheel. An electrical steering control signal is generated in response to the rotary position of the steering wheel by a steering wheel position sensor. Means is provided for separately controlling the fluid flow rate from the source of pressurized fluid to each of the hydraulic motors in response to the electrical steering control signal to control the rotational speed of each driven wheel separately and thereby control steering of the vehicle.

The apparatus further includes means for providing an electrical speed command signal responsive to an operator inputted speed command. The means for separately controlling fluid flow rates to the hydraulic motors is responsive to the electrical speed command signal, as well as the electrical steering control signal.

The apparatus further includes means for selecting one of a plurality of steering ratios so that, for a given amount of steering wheel rotation, a variable amount of turning of the vehicle occurs. When a different ratio is selected, different fluid flow rates to the hydraulic motors are provided. By providing different fluid flow rates to the hydraulic motors for a given position of the steering wheel, a variable steering ratio is established.

The apparatus also includes an engine driven pump for outputting pressurized fluid used to drive the hydraulic motors. An electronic control unit is provided to monitor vehicle engine speed and for limiting vehicle ground speed in response to the sensed engine speed so as to prevent engine stall and pump cavitation. The vehicle ground speed is limited by the output of pressurized fluid from the engine driven pump to the hydraulic motors. The maximum output of pressurized fluid from the engine driven pump to the hydraulic motors is established by the electronic control unit in response to the sensed vehicle engine speed.

In accordance with a preferred embodiment of the present invention, a vehicle includes at least two drivable wheels located on opposite sides of the vehicle. Each drivable wheel has an associated hydraulic motor operatively connected thereto. The motors are rotatable in both a forward direction and a reverse direction in response to pressurized fluid conducted therethrough. The direction of fluid flow through each motor controls the direction of motor rotation. An engine-driven pump is operatively connected to each of the hydraulic motors through associated valve arrangements.

Each valve arrangement includes an electrically controllable directional control valve and an electrically controllable load sense flow control valve assembly connected in series between the associated hydraulic motor and the piston pump. The direction of the fluid flow and the fluid flow rate to each of the hydraulic motors is respectively controlled by their associated directional control valve and their associated flow control valve assembly.

A microcomputer is electrically connected to each of the directional control valves and to each of the flow control valve assemblies. The steering wheel position sensor is electrically connected to the microcomputer. The pedal position sensor associated with the operator controlled speed pedal is also electrically connected to the microcomputer. An RPM sensor is operatively connected to the engine driving the pump and provides an electrical signal indicative of the engine RPM. The RPM sensor is electrically connected to the microcomputer. Each drive wheel has an associated speed sensor which provides an electrical signal indicative of the rotational speed of its drive wheel. Each of the wheel speed sensors is also electrically connected to the microcomputer.

The microcomputer controls the directional control valves and the flow control valve assemblies in response to sensed steering wheel position and sensed position of the speed pedal. The microcomputer includes memory means divided into a plurality of look-up tables providing different steering ratios. The microcomputer selects and uses control values from the look-up tables to control the fluid flow rates and the directions of fluid flow to the hydraulic motors. For a given position of the steering wheel, different control values from the look-up tables are selectable. Different fluid flow rates are provided for different control values. Since different fluid flow rates are provided for a given position of the steering wheel, a variable steering ratio is established.

The microcomputer determines whether the output signal from the speed pedal position sensor is within predetermined limits. If the output signal is not within limits, fluid flow to the hydraulic motor is prevented. The microcomputer further controls the ground speed of the vehicle in response to sensed engine RPM's to prevent cavitation of the load sense piston pump and to prevent stalling of the engine. The microcomputer further monitors the rotational speed of the drive wheels to ensure that their actual speed is equal to their desired speed and makes adjustments to the fluid flow rates to each hydraulic motor via their associated flow control valve in response thereto. Preferably, each of the flow control valve assemblies is controlled by an associated pulse width modulated signal.

BRIEF DESCRIPTION OF THE DRAWINGS

Further features and advantages of the present invention will become apparent to those skilled in the art to which the present invention relates from reading the following detailed description with reference to the accompanying drawings in which.

DETAILED DESCRIPTION

Figure 1:
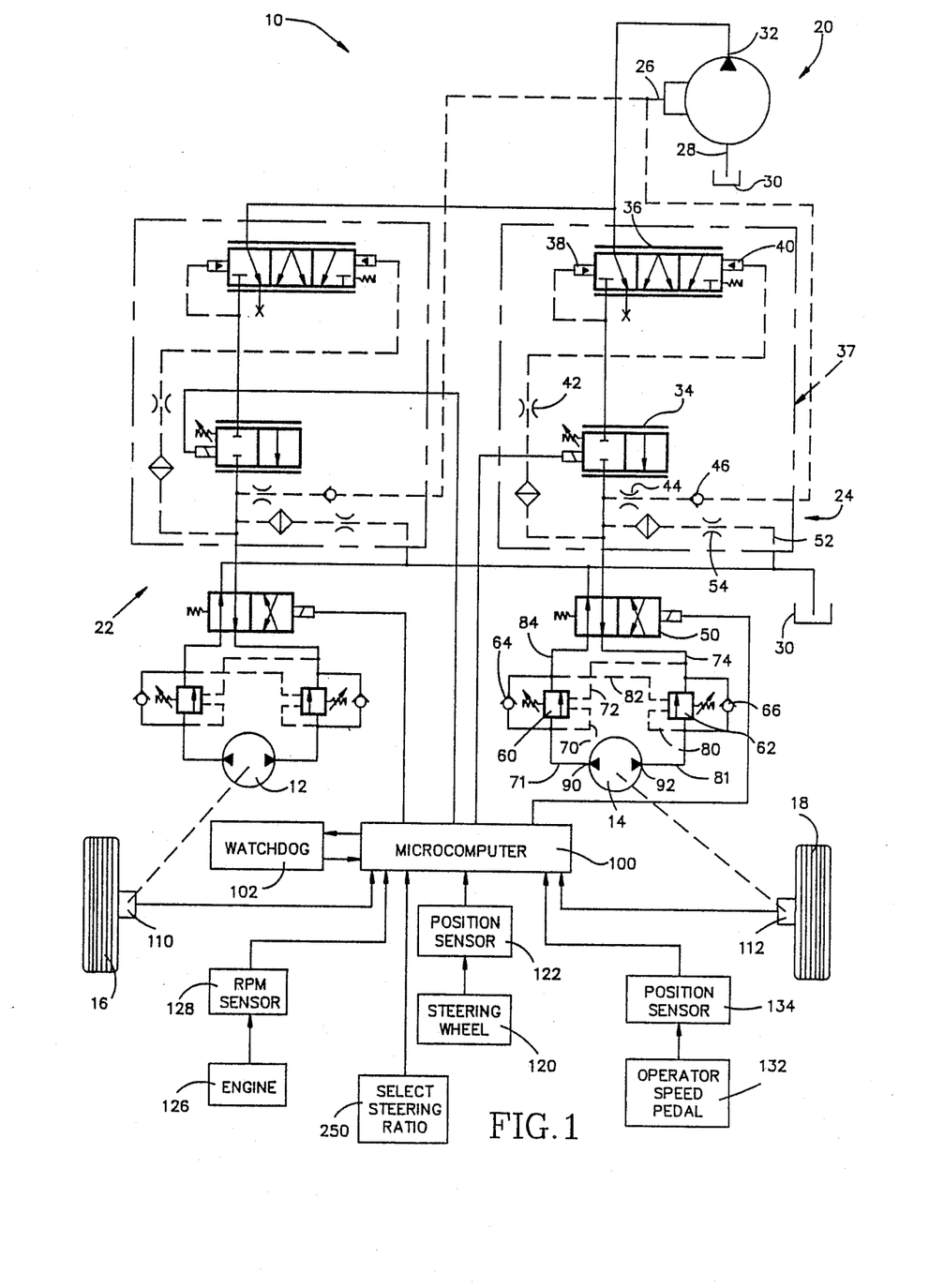
FIG. 1 is a schematic illustration of a steering-by-driving system in accordance with the present invention.

Referring to FIG. 1, a steering-by-driving system 10 includes two hydraulic motors 12, 14 drivably connected to associated drive wheels 16, 18, respectivey, of a vehicle. Each of the hydraulic motors rotates in response to pressurized fluid conducted therethrough. The speed of rotation of the motors 12, 14, and thus the speed of drive wheels 16, 18, is a function of the fluid flow rate therethrough. Each of the motors is reversible, the direction of rotation being controlled by the direction of the fluid flow through the motor. Each of the hydraulic motors 12, 14 is connectable with a load sense piston pump 20 through associated valve arrangements 22, 24.

The load sense piston pump 20 includes a movable swash plate, the position of which controls pump displacement. The position of the swash plate and thus pump displacement is controlled in response to fluid pressure present at a load sense inlet 26 of the pump 20. An inlet 28 of the pump 20 is in fluid communication with fluid in a reservoir 30. The pump 20 has an outlet 32 for directing fluid for operating the hydraulic motors 12, 14.

The valve arrangements 22, 24 are similar in structure. Therefore, for simplicity in explanation, only one of the valve arrangements is discussed in detail herein. The outlet 32 of the pump 20 is in fluid communication with an electrically controlled variable orifice 34 through a pressure compensation spool valve 36. Variable orifice 34 and valve 36 form an electrically controllable load sense flow control valve assembly 37. One pilot port 38 of the pressure compensation spool valve 36 is in fluid communication with the pump side of the electrically controlled variable orifice 34. The other pilot port 40 of the spool valve 36 is connected to the outlet side of the electrically controlled variable orifice 34 through a fixed orifice 42. The load sense inlet 26 of the pump 20 is in fluid communication with the outlet side of the electrically controlled variable orifice 34 through a fixed orifice 44 and a check valve 46.

The pressure compensation spool valve 36 is of the type well known in the art. In one position, the valve 36 completely blocks fluid communication between the pump 20 and load sense inlet through variable orifice 34. In a second position, the valve 36 provides complete fluid communication between pump 20 and load sense inlet 26 through variable orifice 34. When in between the first and second positions, valve 36 provides proportional fluid communication between pump 20 and load sense inlet 26. The swash plate angle, and in turn the maximum fluid flow rate from the pump 20, is controlled by the pressure compensation spool valve 36 and variable orifice 34. The swash plate angle will change to match the total equivalent orifice area of the two load sense valves 36 and variable orifices 34.

The outlet side of the electrically controllable load sense flow control valve assembly 37 is connectable to the hydraulic motor 14 through one port of an electrically controllable directional control valve 50. A pilot line 52 further connects the outlet of the electrically controlled variable orifice 34 to the reservoir 30 through a fixed orifice 54. This line 52 allows leakage in valve 36 and orifice 34 to escape without going through the motor 14. The directional control valve 50 has a second port in fluid communication with the reservoir 30.

The directional control valve 50 further includes two ports connected to opposite sides of the hydraulic motor 14 through respective counter balance valves 60, 62 and two check valves 64, 66 which are respectively connected in parallel. A pilot line 70 of the valve 60 is connected to a hydraulic line 71 connecting the valve 60 and the hydraulic motor 14. A pilot line 72 of the valve 60 is connected to a hydraulic line 74 connecting the directional control valve 50 with the valve 62. A pilot line 80 of valve 62 is connected to a hydraulic line 81 connecting the valve 62 with the hydraulic motor 14. A pilot line 82 of the valve 62 is connected to a hydraulic line 84 connecting the valve 60 with the directional control valve 50.

The counter balance valves 60, 62 are spring biased to a closed condition as are the check valves 64, 66. When the directional control valve is in the first condition, as is shown in FIG. 1, pressurized fluid is directed to the line 74. As pressure in line 74 increases, check valve 66 opens thereby permitting fluid to flow to port 92 of the motor 14. When the pressure in the line 74 reaches a sufficient value, the pressurized fluid in the pilot line 72 moves the valve 60 to an open condition thereby communicating port 90 of the motor 14 with the reservoir 30. Pressurized fluid entering the port 92 and fluid returning to reservoir through port 90 drives the motor 14 in a first direction. To effect rotation of the motor 14 in the opposite direction, the directional control valve is placed in its second condition which directs pressurized fluid to the port 90 while connecting line 74 to the reservoir 30. When in this second condition, pressurized fluid directed to line 84 opens check valve 64 thereby permitting fluid to flow to port 90 of motor 14. When sufficient pressure exists in line 84, the pressurized fluid moves valve 62 to an open condition thereby communicating port 92 of motor 14 with the reservoir 30.

The flow control valve assembly 37 and the directional control valve 50 are both electrically connected to a microcomputer 100. The microcomputer, in a preferred embodiment, can be any of several types available on the market such as an INTEL 8748. A watchdog circuit 102 is electrically connected to the microcomputer 100. Watchdog circuits are well known in the art and therefore will not be described in detail herein. Briefly, the microcomputer periodically outputs a pulse to the watchdog circuit as an indication that the microcomputer is operating properly, i.e., not "stuck" in an endless software loop. The watchdog circuit continuously monitors for the periodic output pulse. If a predetermined time period lapses without the watchdog circuit receiving the pulse, the watchdog circuit outputs a signal to reset the microcomputer 100.

Each of the drive wheels 16, 18 respectively have speed sensors 110, 112. Each of the speed sensors 110, 112 output an electric signal indicative of the rotational speed of its associated drive wheel. The microcomputer monitors the output signal from the speed sensors 110, 112 and determines the speed of each drive wheel 16, 18.

A steering wheel 120 is rotatably mounted in the vehicle. An electrical position sensor 122 monitors the rotational position of the steering wheel 120 and outputs an electrical signal indicative thereof. The output of the position sensor 122 is electrically connected to the microcomputer 100.

The vehicle includes an engine 126 which is used to drive the pump 20. An RPM sensor 128 is coupled to the engine 126 and provides an electrical signal indicative of the rotational speed of the engine 126. The RPM sensor 128 is electrically connected to the microcomputer 100.

An operator controlled speed pedal 132 is provided in the vehicle. A position sensor 134 is coupled to the pedal 132 and provides an electrical signal indicative of the position of the speed pedal 132. The position sensor 134 is electrically connected to the microcomputer 100. The operator speed pedal 132 is mechanically adapted and the position sensor 134 is electrically adapted so as to provide a DC electrical signal having one value ("the initial zero value") when the vehicle is not moving. The pedal can be moved in either of two directions. In one direction the output of the sensor 134 increases above the initial zero value. In the other direction, the output of the sensor 134 decreases below the initial zero value. For example, assume that the position sensor 134 and speed pedal 132 are adapted so that the sensor 134 outputs six volts DC when the speed pedal is in a position indicative of the vehicle not moving. The initial zero value is equal to six volts DC. If the pedal 132 were moved in one direction, the output voltage from the sensor 134 would increase above six volts DC. If the speed pedal were moved in the second direction, the output of the sensor 134 would be less than six volts DC. The position sensor 134 and the speed pedal 132 are designed so that the output of sensor 134 is to remain within predetermined limits such as 3 to 9 volts DC. An output voltage outside of either limit indicates a failure.

The microcomputer 100 monitors the signals provided by each of the sensors 122, 128, 134, and the drive wheel speed sensors 110, 112 and outputs electrical control signals to the flow control valve assembly 37 and the directional control valve 50 in response thereto.

The flow control valve assembly 37 is preferably controlled using a pulse width modulated ("PWM") signal outputted from the microcomputer 100. The valve assembly 37 is spring biased to a closed condition. The size of the opening of the variable orifice 34 varies as a function of the percentage duty cycle of the PWM control signal.

The microcomputer includes a read only memory ("ROM") having program instructions to implement steering control in accordance with the present invention. The microcomputer further includes an internal memory that is divided into a plurality of look-up tables. A first look-up table stores a plurality of numeric values indicative of maximum fluid flow values that are permitted to be delivered from the pump 20 to the hydraulic motors 12, 14, the values varying as a function of engine speed. Each value of engine speed has an associated maximum fluid flow value. A second look-up table stores a plurality of numeric values indicative of desired total fluid flow rates to the hydraulic motors 12, 14 as a function of a given position of the operator controlled pedal 132. A third look-up table includes values for proportioning fluid flow from the pump 20 to the hydraulic motors 12, 14 for a given position of the steering wheel 120.

Speed, direction, and steering of the vehicle requires control of both drivable wheels 16, 18. In response to the signals from the sensors 122, 128, 134 and the speed sensors 110, 112, the microcomputer 100 selects control values from selected look-up tables and generates electrical control signals to control the flow control valve assemblies 37 and the directional control valves 50 in response thereto.

Figure 2:
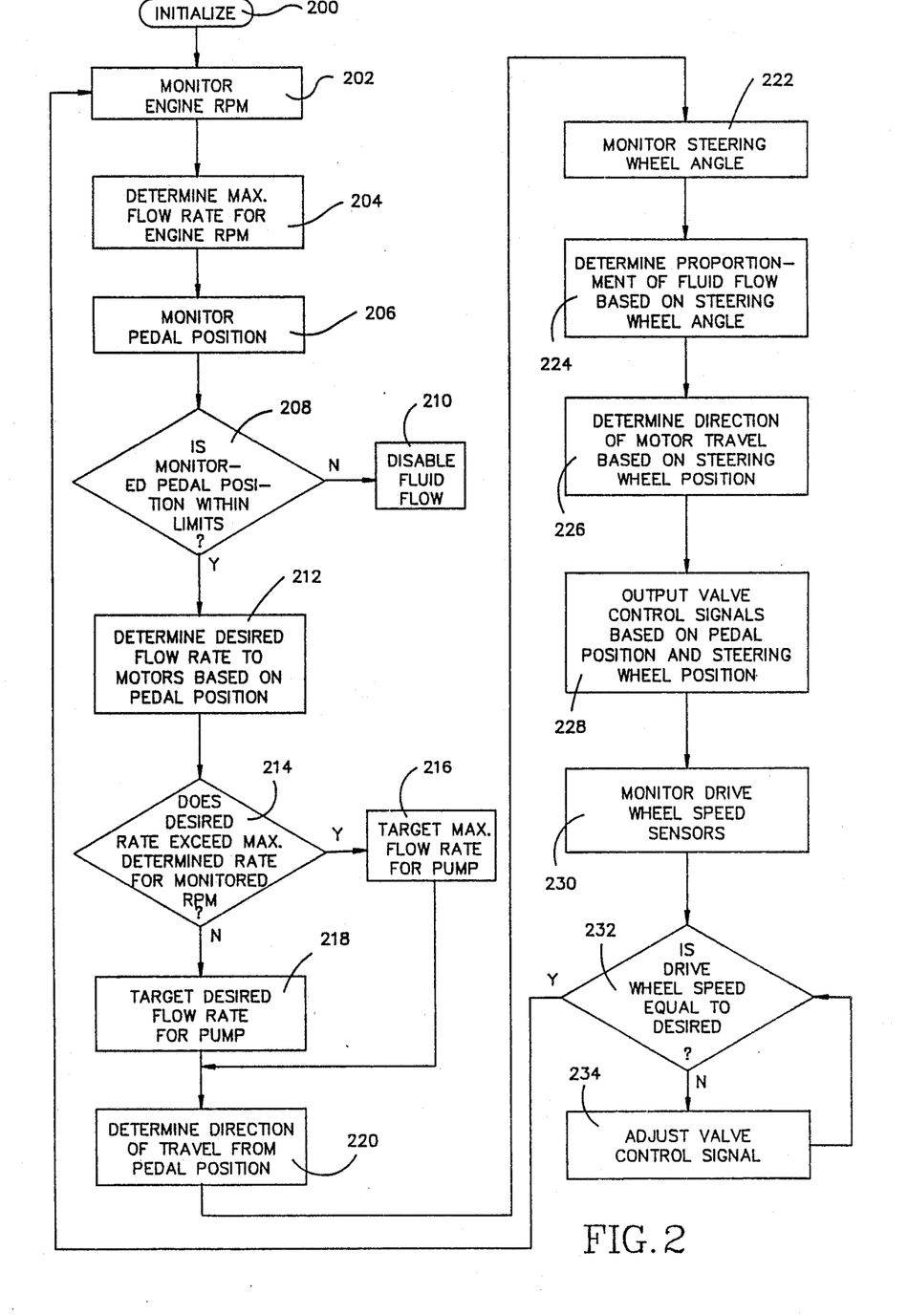
FIG. 2 is a flow chart illustrating control steps of a steering-by-driving system in accordance with the present invention.

Referring to FIG. 2, a control process, in accordance with the present invention, is shown in which the system is initialized in step 200. As part of the system initialization, power is first applied to the microcomputer 100, internal diagnostic tests are performed, and an internal, temporary storage memory is cleared. In step 202, the microcomputer 100 monitors the output signal from the RPM sensor 128. For the monitored engine speed, the microcomputer 100 determines in step 202 the maximum flow rate that can be outputted from the pump 20. This is preferably accomplished using a first look-up table. A maximum flow rate value is selected from the look-up table based on monitored engine speed. In step 206, the position of the speed control pedal 132 is monitored. In step 208, it is determined whether or not the monitored pedal position is within its predetermined limits. If the determination in step 208 is negative, the program proceeds to step 210 where fluid flow to the hydraulic motors is disabled.

It will be appreciated that the fluid flow between the pump 20 and either motor 12, 14, can be disabled by outputting an electrical signal to valve assembly 37 which positions the valve 36 so as to block fluid communication between the pump 20 and the hydraulic motor 14. If the determination in step 208 is affirmative, the program proceeds to step 212 where the desired flow rate to the motors is determined based upon the position of the pedal 132. This is accomplished in a preferred embodiment using a second look-up table. A flow rate value is selected from the second look-up table based on the monitored position of the pedal 132. In step 214, a decision is made as to whether the desired flow rate determined in step 212 exceeds the maximum determined rate for the monitored engine RPM This is accomplished in a preferred embodiment by comparing the number selected from the first look-up table against the number selected from the second look-up table. If the determination in step 214 is affirmative, the program proceeds to step 216 where the microcomputer 100 targets the maximum flow rate for the pump 20 to be equal to maximum determined flow rate. If the determination in step 214 is negative, the program proceeds to step 218 where the microcomputer targets the flow rate for the pump to be equal to the desired flow rate. The targeted flow rate is the total flow rate that the microcomputer tries to establish to the motors 12, 14 using the flow control valve assemblies 37. The targeted flow rate is therefore limited to the smaller of the maximum determined flow rate or the desired flow rate. Limiting flow rate limits vehicle ground speed. By limiting the vehicle ground speed in response to the monitored engine RPM, engine stall and pump cavitation is prevented.

The program proceeds from either step 216 or step 218 to step 220 where the direction of travel is determined from the pedal position. The microcomputer 100 monitors the steering wheel angle in step 222. In step 224 the microcomputer 100 determines the proportionment of targeted fluid flow rate that is to be directed to each of the hydraulic motors 12, 14 based on the monitored steering wheel rotational position. This is accomplished using a third look-up table. A percentage value is selected from the look-up table based on the monitored steering wheel rotational position. The proportionment value selected is multiplied by the targeted flow rate. The multiplication provides a flow rate value for one of the hydraulic motors. Assume that a value of 45% is selected from the third look-up table based on the monitored steering wheel position. The microcomputer multiplies the targeted flow rate times 45% and establishes the calculated number as the flow rate value for the motor 12. The microcomputer then takes the targeted flow rate and subtracts the flow rate value calculated for motor 12 and uses this number as the flow rate value for the motor 14. The microcomputer then uses a fourth look-up table to convert the calculated flow rate values for each of the motors to a duty cycle value for the associated valve 34. In step 226, the microcomputer determines the direction of motor travel based on the position of the steering wheel 120. In step 228, the microcomputer 100 outputs valve control signals to each of the flow control valve assemblies 37 and the directional control valves 50 based upon position of the pedal 132 and rotational position of the steering wheel 120. The microcomputer 100 monitors the rotational speed of the drive wheels 16, 18 through the sensor 110, 112 in step 230. A determination is made in step 232 as to whether the rotational speed of the drive wheels 16, 18 is equal to the desired rotational speed based upon the values outputted in step 228. If the determination in step 232 is negative, the program proceeds to step 234 where the valve assemblies 37, and valves 50 are adjusted in such a manner as to make the determination in step 232 affirmative. When the determination in step 232 is affirmative, the program proceeds back to step 202 and the program continues as described above.

To achieve zero turning radius of the vehicle, the operator rotates the steering wheel 120 in the desired direction of rotation past a predetermined angular position from a straight ahead location. The operator speed pedal 132 controls the speed of the angular rotation of the vehicle. The direction of rotation is further controllable using the operated speed pedal 132. If the pedal is moved in one direction away from the initial zero position, the vehicle rotates in one direction. If the pedal is moved in the other direction away from the initial zero position, the vehicle rotates in the other direction.

The step 224, discussed above, determines the proportionment of the targeted fluid flow rate to each of the hydraulic motors based upon the steering wheel angle. The fluid flow proportionment determines the vehicle steering angle as a function of steering wheel angular position. The proportionment of fluid flow can be established as described above by use of look-up tables. The values can also be established by calculation. The ratio between steering wheel position and vehicle steering angle can be preselected through the look-up tables or use of constants in calculations.

Referring to FIG. 1, an operator controlled steering ratio selector 250 is shown in another embodiment of the invention, electrically connected to the microcomputer 100. The microcomputer 100 in this embodiment includes a plurality of look-up tables used for the selection of proportionment values for a given steering wheel position. Each of the look-up tables would have different proportionment values for a given steering wheel position. Assume a steering angle of 5 degrees in one direction. One proportionment look-up table may have a value of 55% of the target flow rate for a 5 degree steering angle. Another proportionment table may have a value of 60% of the targeted flow rate for a 5 degree steering angle. The operator turns a dial of the ratio selector 250 to select a desired steering ratio. The microcomputer selects a steering ratio look-up table based on the setting of the selector 250.

This invention has been disclosed with reference to a preferred embodiment. Modifications and alterations may occur to others upon reading and understanding this specification. It is our intention to include all such modifications and alterations insofar as they come within the scope and spirit of the appended claims or their equivalent thereof.

Having described a preferred embodiment of the invention, we claim:

1. An apparatus for controlling propelling rotation of at least two driven wheels of a vehicle in response to rotation of a steering wheel, said apparatus comprising:
   a source of pressurized fluid;
   hydraulic motors, each drive wheel having an associated hydraulic motor for, when pressurized with said pressurized fluid, driving such motor's associated wheel in propelling rotation;
   means for generating an electrical control signal having a value responsive to the rotary position of the steering wheel, each rotary position of the steering wheel resulting in a different control signal value; and
   means for separately controlling fluid flow rate from said source of pressurized fluid to each of the hydraulic motors in response to the value of said electrical control signal so as to control the propelling rotation speed of each driven wheel separately, the vehicle being steered as a result of the propelling rotational speed of the driven wheels, the steering angle of the vehicle being thereby functionally related to the rotary position of the steering wheel, said means for separately controlling fluid flow rate to each motor including electrically controlled valves, each motor having an electrically controlled valve connected in series between said source of pressurized fluid and such motor, and means for generating valve control signals responsive to the value of said electrical control signal so as to separately control the fluid flow rate from the source of pressurized fluid to each motor.

2. The apparatus of claim 1 further including means for generating a second electrical control signal in response to the position of an operator positionable speed command device, said means for separately controlling fluid flow rate to each motor being further responsive to the second electrical control signal so that the rotational speed of each driven wheel is functionally related to both the rotary position of the steering wheel and the position of the speed command device.

3. The apparatus of claim 1, wherein said means for separately controlling fluid flow rate to each motor further includes memory means comprising a look-up table having a plurality of fluid flow proportionment values, each value of said electrical control signal and, in turn, each rotary position of the steering wheel having an associated fluid flow proportionment value, said means for generating valve control signals being responsive to a fluid flow proportionment value from the look-up table corresponding to a present value of said electrical control signal.

4. The apparatus of claim 1, wherein said means for separately controllig fluid flow rate to each motor further includes memory means comprising a plurality of look-up tables, each look-up table having a plurality of fluid flow proportionment values, each value of said electrical control signal and, in turn, each rotary position of the steering wheel having an associated fluid flow proportional value, said means for generating valve control signals being responsive to a fluid flow proportionment value from the look up table corresponding to a present value of said electrical control signal, each look-up table providing a different ratio between steering wheel rotational position and vehicle steering angle, said apparatus further comprising means accessible to the vehicle operator for selecting one of said look-up tables to thereby select a desired steering ratio.

5. The apparatus of claim 1, wherein said means for generating the valve control signals includes means for generating pulse width modulated control signals, the duty cycle of each pulse width modulated control signal varying in response to the value of said electrical control signal and controlling valving of its associated valve.

6. The apparatus of claim 5 wherein said means for separately controlling fluid flow rate from the source of pressurized fluid to each of the motors further includes memory means having a look-up table for storing a plurality of duty cycle values, each value of each valve control signal having an associated duty cycle value.

7. An apparatus for controlling propelling rotation of at least two driven wheels of a vehicle in response to movement of a steering member, said apparatus comprising:
   a fluid source;
   a hydraulic motor associated with each driven wheel for, when pressurized with fluid, rotating the respective wheel in a particular propelling rotational direction dependent upon the direction of fluid flow through the hydraulic motor;
   means for generating a first electrical signal having a value responsive to the position of the steering member, each position of the steering member resulting in a different first electrical signal value;
   control means for controlling the fluid flow rates from said fluid source to the hydraulic motors and for controlling the directions of fluid flow through said hydraulic motors, the fluid flow rate and direction of fluid flow through each hydraulic motor varying as a function of said value of said first electrical signal, the vehicle being steering as a result of the rotational speed and direction of rotation of the driven wheels, said control means including means for permitting fluid flow to the hydraulic motors in opposite directions so as to cause the motors to rotate in opposite propelling rotational directions and selection means operable by a vehicle operator for selecting the functional relationship between fluid flow rates to the hydrualic motors and the position of the steering member so as to provide a selectable steering ratio.

8. The apparatus of claim 7 further including an operator positionable speed command member and means for generaitng a second electrical signal indicative of the position ofthe speed command member, the vehicle speed and direction being further responsive to the second electrical control signal so that the rotational speed and direction of each driven wheel is functionally related to both the rotary position of the steering wheel and the position of the speed command device.

9. The apparatus of claim 8 wherein said control means includes a microcomputer, said microcomputer including memory means divided into a plurality of look-up tables, each look-up table storing fluid flow direction and rate values corresponding to the first and second electrical signals, said selection means controlling which look-up table is used by the control means.

10. The apparatus of claim 9 wherein said control means further includes valve means for controlling directions of fluid flow through said hydraulic motors, said valve means being an electrically controllable directional control valve associated with each of said hydraulic motors, said valve means being responsive to said flow direction value from a selected look-up table.

11. The apparatus of claim 9 wherein said control means further includes electrically controlled valves, each motor having an electrically controlled rate valve connected in series between said fluid source and its associated motor, and said control means further includes means for providing pulses width modulated signals for control of said electrically controlled rate values, the duty cycle of each pulse width modulated signal being responsive to said rate value selected from said look-up table.

12. The apparatus of claim 9 wherein said fluid source is an engine dirven pump and said control means further includes means for limiting the fluid flow rates to the hydraulic motors when the speed of the vehicle engine is less than a predetermined value.

13. An apparatus for controlling at least two driven wheels of a vehicle, said apparatus comprising:
 a source of pressurized fluid;
 hydraulic motors, each driven wheel having an associated hydraulic motor for, when pressurized with said pressurized fluid, driving such motor's associated wheel in propelling rotation;
 an operator controlled speed input device for generating an electrical control signal, the input device being movable from an initial position to a first location in one direction and to a second location in another direction, said electrical control signal having a value that is functionally related to the position of the input device;
 means for separately controlling fluid flow rate from the source of pressurized fluid to each of the hydraulic motors in response to the value of said electrical control signal, said vehicle (i) remaining stationary when the input device is in said initial position, (ii) moving in a first direction when the input device is moved toward said first direction, and (iii) moving in a second direction when the input device is moved toward said second direction; and
 means for establishing a maximum limit and a minimum limit on the value of said electrical control signal, means for comparing the value of said electrical control signal against said established maximum and minimum limits and providing a signal indicative of whether the value of said electrical control signal is within said established limits, and means for preventing said pressurized fluid from pressurzing said hydraulic motors when said signal provided from said means for comparing indicates said electrical control signal is not within said established minimum and maximum limits.

14. The apparatus of claim 13 further including a steering wheel, means for generating an electrical control signal indicative of the rotary position of said steering wheel, each rotary position of the steering wheel resulting in a different control signal value, and wherein said means for separately controlling the fluid flow rate from the source of pressurized fluid to each of the motors is further responsive to rotary position of the steering wheel so that the rotational speed and direction of each driven wheel is functionally related to both the position of the speed input device and the rotary position of the steering wheel.

15. An apparatus for controlling a steering-by-driving system of a vehicle having an engine and hydraulically driven motors for driving wheels or the like of the vehicle, said apparatus comprising:
 a load sense piston pump driven by the engine for providing pressurized fluid, the amoutn of pressurized fluid being responsive to engine RPM's;
 means for valving pressurized fluid from said pump to said motors in response to an electrical control signal, said driving wheels rotating at a speed which is functionally related to the valving of the pressurized fluid from the pump; and
 means for establishing a maximum value of said electrical control signal in resposne to said sensed engine speed so as to limit the rotational speed of the driving wheels and thereby prevent improper operation of said load sense piston pump.

16. The apparatus of claim 15 further including an operator positionable speed input device for generating said electrical control signal, the input device being movable from a n initial position to a first location in one direction and to a second location in another direction, said electrical control signal having a value that varies as a function of the position of the input device and wherein said means for valving pressurized fluid from said pump to said motors is responsive to said electrical control signal so that the direction and speed of the vehicle is functionally related to the position of the speed input device and the value of the engine RPM's.

17. The apparatus of claim 16 further including a steering wheel, means for generating a second electrical control signal, said second electrical control signal having a value indicative of the rotary position of said steering wheel, wherein said means for valving pressurized fluid from said pump to said motors is further responsive to said second electrical signal so that the rotational speed of each driving wheel is functionally related to the rotary position of the steering wheel, the position of the speed input device, and the value of the engine RPM's.

* * * * *

UNITED STATES PATENT AND TRADEMARK OFFICE
CERTIFICATE OF CORRECTION

PATENT NO. : 4,914,592

DATED : April 3, 1990

INVENTOR(S) : William L. Callahan, Bruce C. Noah, Jonathan B. Kulp

It is certified that error appears in the above-identified patent and that said Letters Patent is hereby corrected as shown below:

Column 9, Line 33, Claim 1, Change "drive" to --driven--.

Column 9, Line 46, Claim 1, Change "rotation" to --rotational--.

Column 10, Line 21, Claim 4, Change "proportional" to --proportionment--.

Column 10, Line 42, Claim 6, Change "each" to --said--.

Column 10, Line 64, Claim 7, Change "steering" to --steered--.

Column 11, Line 10, Claim 8, Change "ofthe" to -- of the--.

Column 11, Line 36, Claim 11, Change "pulses" to --pulse--.

Column 11, Line 38, Claim 11, Change "values" to --valves--.

Column 12, Line 11, Claim 13, Change "pressurzing" to --pressurizing--.

UNITED STATES PATENT AND TRADEMARK OFFICE
CERTIFICATE OF CORRECTION

PATENT NO. : 4,914,592

DATED : April 3, 1990

INVENTOR(S) : William L. Callahan, Bruce C. Noah, Jonathan B. Kulp

It is certified that error appears in the above-identified patent and that said Letters Patent is hereby corrected as shown below:

Column 12, Line 32, Claim 15, Change "amoutn" to --amount--.

Column 12, Line 47, Claim 16, Change "a n" to --an--.

Signed and Sealed this

Ninth Day of July, 1991

Attest:

HARRY F. MANBECK, JR.

*Attesting Officer*

*Commissioner of Patents and Trademarks*